United States Patent
Uemura et al.

(10) Patent No.: US 7,408,731 B2
(45) Date of Patent: Aug. 5, 2008

(54) TRACK ALLOCATION METHOD OF DISK DRIVE

(75) Inventors: Tetsuya Uemura, Sayama (JP); Hideki Saga, Fuchu (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 30 days.

(21) Appl. No.: 11/645,131

(22) Filed: Dec. 21, 2006

(65) Prior Publication Data

US 2007/0183071 A1 Aug. 9, 2007

(30) Foreign Application Priority Data

Jan. 4, 2006 (JP) ............... 2006-000066

(51) Int. Cl.
G11B 5/09 (2006.01)
G11B 21/02 (2006.01)

(52) U.S. Cl. ..................... 360/48; 360/72.1
(58) Field of Classification Search .......... None
See application file for complete search history.

(56) References Cited

U.S. PATENT DOCUMENTS 6,185,063 B1 2/2001 Cameron

2004/0190185 A1 * 9/2004 Lee ............... 360/75

FOREIGN PATENT DOCUMENTS

WO WO 99/45534 9/1999

* cited by examiner

*Primary Examiner*—Jason Olson
(74) *Attorney, Agent, or Firm*—Townsend and Townsend and Crew LLP; Patrick Duncan

(57) ABSTRACT

Embodiments in accordance with the present invention relate to methods wherein a capacity of a disk drive is increased by partially overwriting adjacent tracks to shorten the track width and collectively updating a data update unit made up of a plurality of tracks, wherein the capacity reduction caused by a defective track is suppressed. Track groups having two types of track widths, or Shingled Tracks(ST) and Tiled Tracks(TT), are allocated in a zone. First, the zone is divided into two areas, namely, a shingled track (ST) area and a spare or tiled track (TT) area. When a defective track is detected in the shingled track (ST) area, it is checked whether or not the spare or tiled track (TT) area affords an area to be transferred. If it does, an area is transferred from the spare or tiled track (TT) area to the shingled track (ST) area. When it is confirmed that the allocation of ST has been completed, TT is allocated to the remaining spare or tiled track (TT) area in subsequent steps.

8 Claims, 6 Drawing Sheets

Fig. 1
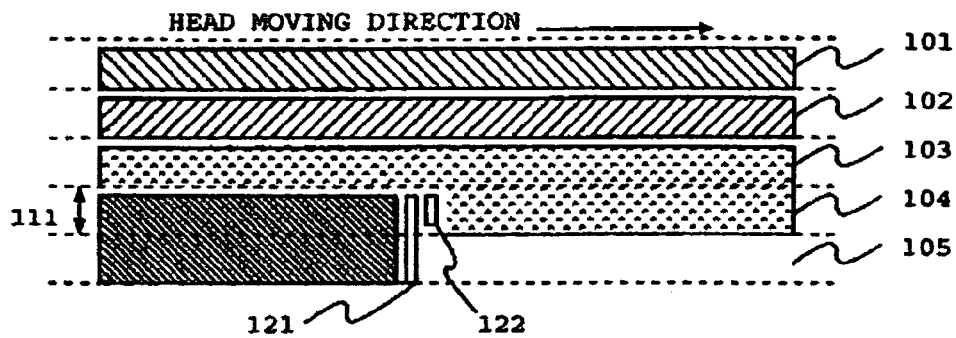
Fig. 2
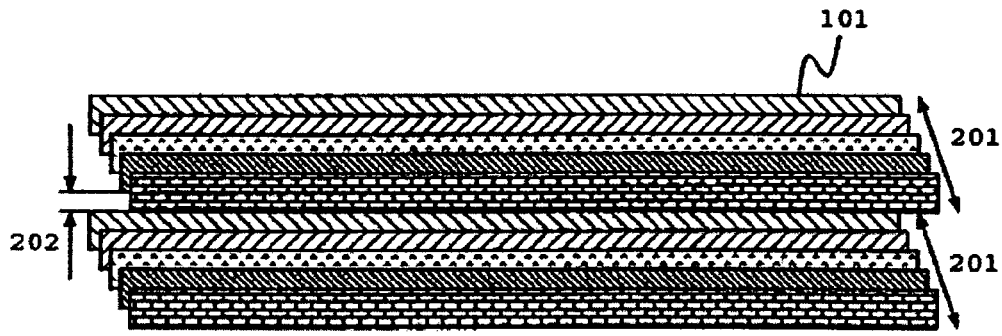
Fig. 3(a)                Fig. 3(b)
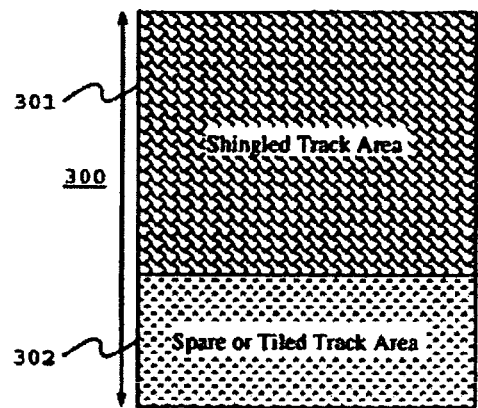 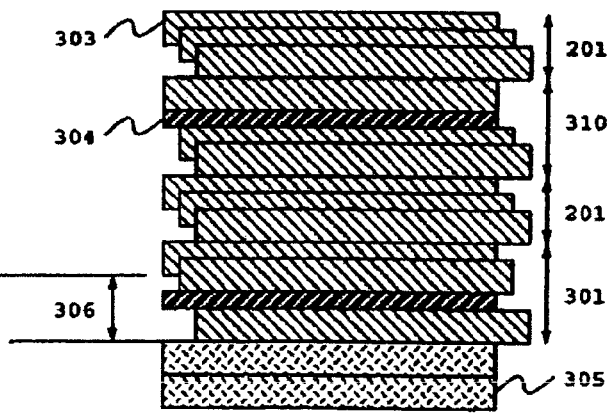

Fig. 5
| FROM_TRACK | TO_TRACK | TRACK_TYPE |
|---|---|---|
| | | |
| | | |
| | | |
| | | |
| | | |
| | | |
| | | |
| | | |
| | | |
Fig. 6(a)              Fig. 6(b)
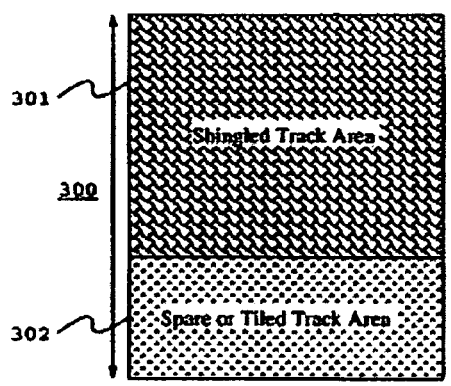
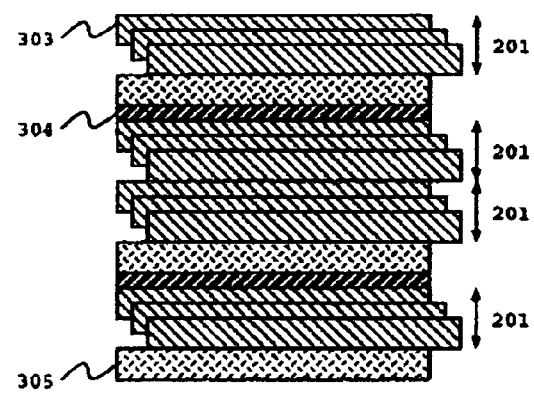

TRACK ALLOCATION METHOD OF DISK DRIVE

CROSS-REFERENCE TO RELATED APPLICATION

The instant nonprovisional patent application claims priority to Japanese Patent Application No. 2006-000066, filed Jan. 4, 2006 and incorporated by reference herein for all purposes.

BACKGROUND OF THE INVENTION

Embodiments in accordance with the present invention relate to a track allocation method of a disk drive. Particular embodiments in accordance with the present invention relate to a method of allocating a track group to a disk drive wherein there exist a plurality of track widths in a zone which is a group of tracks each having the same number of sectors.

As a method to improve recording density of a disk drive, its track width and track density are shortened. One of the ways of achieving this is to make a writing head and a reading head of the disk drive finer. By making the head finer, it becomes possible to write data to a track with narrower width. Further, the track density is improved by shortening the track width. The writing head and the reading head are fixed to an arm, and the arm is driven by a voice coil motor. Since the arm is moved by the voice coil motor, an error is caused as the arm moves. Therefore, there is possibility that the writing head juts out into the tracks on both sides of the subject track and destroys data. In order to prevent such data destruction, a track pitch is made to be larger than the track width to secure a writing margin. About 10 percent of the track width is provided on both sides of each track as a writing margin, which obstructs the improvement of the track density. The writing margins are needed on both sides of each track on the disk drive to write data to sectors at random. However, deletion of one of the writing margins becomes possible when writing data in sequence. Therefore, the improvement of the track density becomes possible that much. In other words, the capacity of the disk drive can be improved by about 10 percent even when using the same writing head, reading head, and storage medium.

The track pitch cannot be made narrower than the width of the writing head in the conventional method of writing data for the disk drive. Therefore, the smallest track pitch is determined by the width of the writing head. Accordingly, the method of reducing the track width to be less than the width of the writing head is needed to improve the capacity of the disk drive more than the amount of deletion of the writing margin. As such a method, the track width is enabled to be smaller than the width of the writing head by partially overwriting the adjacent tracks in U.S. Pat. No. 6,185,063 and WO99/45534.

In addition, U.S. Pat. No. 6,185,063 proposes two methods, namely, "write seldom format" and "paired format," as methods of overwriting tracks partially. The rate of reducing the track width is improved if a given track is made unable to be overwritten in a given order in the "write seldom format" by partially overwriting a plurality of tracks mutually. On the other hand, in the "paired format," the rate of reducing the track width decreases if a given track is made unable to be overwritten in a given order by partially overwriting two adjacent tracks.

In the case of saving data like video and audio data of which main purpose is referencing, since contents of the file storing video and audio data are hardly necessary to be updated, they are saved on the "write seldom format" track. On the other hand, since updating takes place in meta information, which is management information of a file, simply by reading the file. Therefore, it is effective to save it on the track of the "paired format."

Further, WO99/45534 proposes a disk drive wherein a zone comprising tracks each having the same number of sectors is divided into a plurality of areas whose track pitches are different.

Deletion of one of the writing margins of the track means that the track is limited to be written in one direction. This also means that it is necessary to divide an area on a storage medium into a plurality of areas and rewrite those areas collectively. Namely, when troubles such as a power failure and a runaway of a host take place and the writing processing is interrupted, there is possibility of destroying data of the track to be written to next because the writing margin doesn't exist. In the "magnetic disk drive" described in WO99/45534, due to its structure wherein adjacent tracks are partially overwritten, the data overwritten are lost.

To prevent such data destruction, WO99/45534 proposes to write additionally for each track or sector and to manage the relation between a logical block address (Logical Block Address, LBA) and a physical block address (Physical Block Address, PBA) by an address translation table. In this method, however, there is a problem of the address translation table becoming huge in volume. For example, when address translation of each sector on a disk drive with capacity of 100 GB is managed, the width of 28 bits is needed in LBA since there are 200 M numbers of sectors and one entry of the address translation table becomes 56 bits. Thus, the size of the address translation table becomes 1.4 GB. Since such a huge address translation table will be stored on the storage medium of the disk drive, the capacity of the disk drive is reduced. Further, since it takes time to search the address translation table, the performance of the disk drive is also lowered.

In order to avoid the performance degradation of the disk drive when updating data, it is effective for a high-order device to update collectively not a sector or a track but a plurality of tracks of which adjacent tracks are partially overwritten. It is desirable that sizes of subject data are the same capacity for the high-order device to update data collectively. There is a technique to allow such data updating wherein the same numbers of tracks are grouped in a zone and regarded as a unit of data update, and wherein the number of tracks in the zone is made to be an integral multiple of the number of tracks of the data update unit.

On the storage medium, there exist defective sectors where data cannot be read out due to the defects made when the storage medium is manufactured and the aged deterioration. Since defective sectors are generated stochastically, the servo data containing positioning information of a head might become a defective sector. The servo data are recorded in a plurality of places on the same track. When some of such servo data are defective sectors, the entire track is assumed to be a defective track and its use is prohibited. Therefore, if the number of tracks in the zone is an integral multiple of the number of tracks to be a data update unit, the track group whose number of tracks doesn't reach the number of tracks of the data update unit cannot be used even when only one defective track is generated. In order to cope with such a problem, there is a method wherein a spare track is prepared in the zone and a defective track is replaced with the spare track. Since it is not possible to predict how many defective tracks are generated, more spare tracks than actually required may be prepared. Because the effective capacity decreases as much as the amount of unused spare tracks, the effect of partially overwriting the adjacent tracks and increasing the capacity is lowered.

WO99/45534 proposes a disk drive wherein a track group with a plurality of track pitches exists in a zone. However, it doesn't disclose a method of allocating tracks to solve the above-described problem.

BRIEF SUMMARY OF THE INVENTION

Embodiments in accordance with the present invention relate to methods wherein a capacity of a disk drive is increased by partially overwriting adjacent tracks to shorten the track width and collectively updating a data update unit made up of a plurality of tracks, wherein the capacity reduction caused by a defective track is suppressed. Track groups having two types of track widths, or Shingled Tracks(ST) and Tiled Tracks(TT), are allocated in a zone. First, the zone is divided into two areas, namely, a shingled track (ST) area and a spare or tiled track (TT) area. Referencing the embodiment shown in FIG. 4, when a defective track is detected in the shingled track (ST) area in step 410, it is checked whether or not the spare or tiled track (TT) area affords an area to be transferred in step 420. If it does, in step 421, an area is transferred from the spare or tiled track (TT) area to the shingled track (ST) area. When it is confirmed in step 440 that the allocation of ST has been completed, TT is allocated to the remaining spare or tiled track (TT) area in steps after step 442.

BRIEF DESCRIPTION OF THE DRAWINGS

FIG. 1 is a conceptual diagram of track arrangement when adjacent tracks are partially overwritten in accordance with an embodiment of the present invention.

FIG. 2 is a conceptual diagram of a band structure composed of a plurality of continuous tracks in accordance with an embodiment of the present invention.

FIG. 3 shows track arrangement in a zone according to a first embodiment of a track allocation method of a disk drive in accordance with the present invention.

FIG. 5 shows a track allocation management table.

FIG. 6 shows track arrangement in the zone according to a second embodiment of a track allocation method of the disk drive in accordance with the present invention.

DETAILED DESCRIPTION OF THE INVENTION

Figure 4:
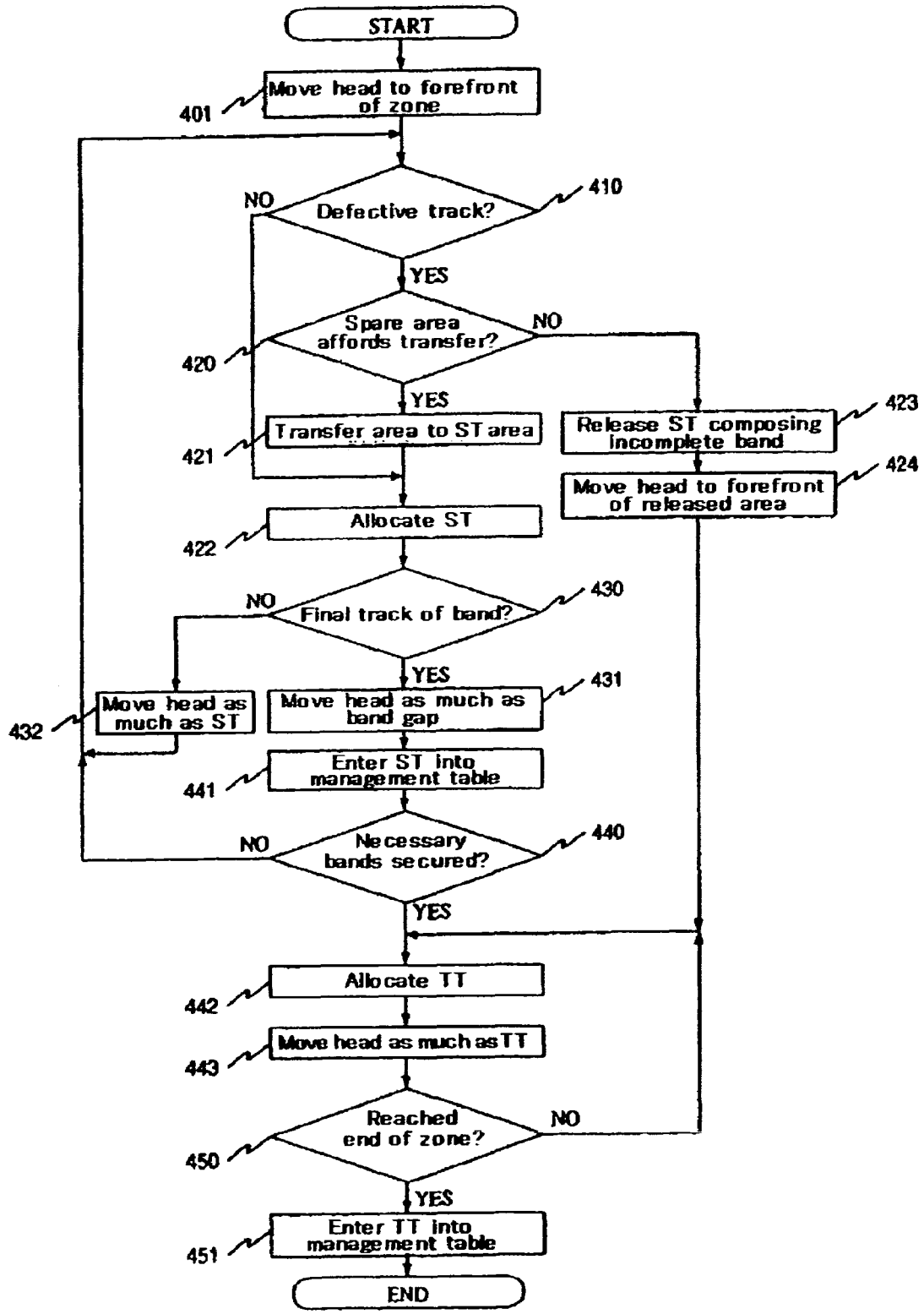
FIG. 4 shows a flowchart of the first embodiment of the track allocation method of the disk drive in accordance with the present invention.

An object of embodiments in accordance with the present invention to provide a track allocation method of a disk drive wherein even if spare tracks for defective tracks are prepared, the effective capacity of the disk drive is not reduced.

In order to achieve the above object, according to embodiments of the present invention, there is provided a track allocation method of a disk drive, the disk drive comprising a storage medium and a controller sending and receiving commands and data to and from a high-order device and performing writing control or reading control over the storage medium, wherein the storage medium is divided into a plurality of zones having different numbers of sectors for each track; wherein there exist a first track group having a first track width and a second track group having a second track width on said storage medium; and wherein, when areas of the first track group and the second track group are secured in the zone, the controller executes the steps of: dividing the zone into a first area for the first track group and a second area for the second track group based on the capacity ratio of the first track group to the second track group to be secured in the zone or based on a first initial value of the capacity of the first track group and a second initial value of the capacity of the second track group; allocating the first track group to the first area; transferring an area lacking because of a defective track from the second area to the first area when there exists the defective track causing prohibition of use of the entire track in the first area; and allocating the second track group to the second area.

The controller sets the capacity ratio or the first initial value and the second initial value based on one value or a plurality of values specified by the high-order device. The controller stores, in a system area of the disk drive referable from the high-order device, the capacity ratio or the first and second initial values, and a ratio of the capacity of the first track group allocated to the first area to the capacity of the second track group allocated to the second area or the capacity of the first track group allocated to the first area and the capacity of the second track group allocated to the second area. Further, the controller executes the steps of: calculating a capacity of the second track group that can be allocated to the second area and halting, when the calculated capacity is less than the prescribed minimum capacity, the executing of the step of transferring tracks lacking because of the defective tracks from the second area to the first area.

Further, according to an embodiment of the present invention, there is provided a track allocation method of a disk drive, the disk drive comprising a storage medium and a controller sending and receiving commands and data to and from a high-order device and performing writing control or reading control over the storage medium, wherein the storage medium is divided into a plurality of zones having different numbers of sectors for each track; wherein there exist a first track group having a first track width and a second track group having a second track width on said storage medium; wherein the first track group is divided into groups each having prescribed first numbers of tracks; and wherein, when areas of the first track group and the second track group are secured in the zone, the controller executes the steps of: dividing the zone into a first area for the first track group and a second area for the second track group based on a capacity ratio of the first track group to the second track group to be secured in the zone or based on a first initial value of the capacity of the first track group and a second initial value of the capacity of the second track group; allocating the first track group to the first area; allocating the second track group with second numbers of tracks to an area in the vicinity of a defective track where the first track group with the first numbers of tracks cannot be secured when there exists the defective track causing prohibition of use of the entire track in the first area and transferring an area corresponding to the second numbers of tracks from the second area to the first area; and allocating the second track group to the second area.

The controller sets the first number of tracks based on a value specified by a high-order device. Further, the controller also transfers an area for the defective tracks from the second area to the first area when transferring an area for the second numbers of tracks from the second area to the first area.

According to an embodiment of the present invention, the effective capacity of the disk drive is improved by recycling the spare tracks other than the minimum spare tracks necessary for the replacing processing of the defective tracks as tracks for recording data. Further, the effective capacity of the disk drive is improved by the track arrangement of the closest packing method by which the utilization rate of the storage medium becomes highest.

Now, referring to the drawings, embodiments of the invention will be described. Like reference numerals refer to like parts. The tracks partially overwriting adjacent tracks are described as "Shingled Tracks (ST)" and the tracks not overwriting adjacent tracks are described as "Tiled Tracks (TT)."

Embodiment 1

The present embodiment is characteristic in that, when there is a defective track in a shingled track (ST) area, an area is transferred from a spare or tiled track (TT) area to the shingled track (ST) area, and TT is allocated to the remaining spare or tiled track (TT) area.

FIG. 1 is a conceptual diagram of track arrangement when adjacent tracks are partially overwritten. Tracks 101 to 105 written with a writing head 121 are partially overwritten. A track width 111 is made to be narrower than a width of the writing head 121 by using a reading head 122 whose width is narrower than the writing head 121. In FIG. 1, after writing data to the track 103, data is written to the track 104. The track 105 is deleted by writing data to the track 104. Therefore, when adjacent tracks are partially overwritten, all tracks within a certain range should be updated once writing of a certain track is started. Such a track group is called a band.

FIG. 2 is a conceptual diagram of a band structure comprising a plurality of continuous tracks. In FIG. 2, numeral 201 denotes a band and numeral 202 denotes a band gap to prevent data destruction between two bands. As shown in FIG. 2, the data of an adjacent band is prevented from being destroyed by making a width of only the track at the end of the band wide, and by providing an area of the band gap 202.

Figure 7:
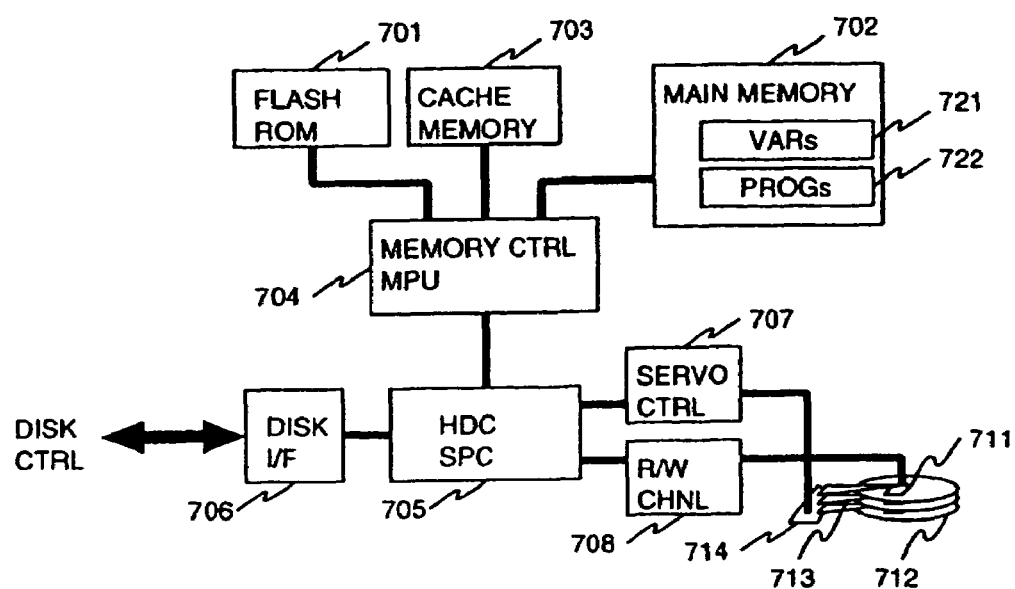
FIG. 7 is a block diagram of the disk drive.

FIG. 7 is a block diagram of a disk drive. A program necessary for starting the disk drive is stored in a flash ROM 701. A main memory 702 is used to store a control program of a memory controller and a microprocessor 704 and various data necessary for the control. A cache memory 703 is used to cache data sent to and received from a disk controller of a high-order device by way of a disk interface 706. A communication protocol used to communicate with the high-order device is processed in a hard disk controller and a SCSI protocol controller part of a SCSI protocol controller 705. The command sent to the SCSI protocol controller is converted to a driving instruction for the writing head and reading head by the memory controller and the microprocessor part of the microprocessor 704 and, then, sent to the hard disk controller and the hard disk controller part of the SCSI protocol controller 705. The hard disk controller controls a servo controller 707 and a read/write channel 708 based on the received instruction, and executes writing or reading data to and from a storage medium. The servo controller 707 controls a voice coil motor 714 so as to move a head 711 mounted on a tip of an actuator arm 713 to a position on a sector to be read of the storage medium 712. When the head 711 has moved to the sector to be read out, the read/write channel 708 executes sending and receiving data to and from the head 711. At this time, the data saved in the cache memory 703 is written to the storage medium when writing data, and the data saved in the storage medium is written to the cache memory 703 when reading data.

When the power of the disk drive is turned on, the memory controller and microprocessor 704 read a start program from the flash ROM 701. Then, the memory controller part initializes the main memory 702 and cache memory 703, controls the servo controller 707 and read/write channel 708 by way of the hard disk controller and SCSI protocol controller 705. Further, the memory controller part reads remaining control programs and various data necessary for the control from the storage medium of the disk drive. The control programs 722 read out and various data 721 are stored in the main memory 702. These control programs 722 include a track allocation program etc. A data structure 721 is described in FIG. 5, and one of the control programs 722 is described in FIG. 4.

FIG. 3 shows track arrangement in a zone according to a first embodiment of a track allocation method of a disk drive of the present invention. In FIG. 3, numeral 300 is a zone, 301 is a shingled track (ST) area, 302 is a spare or tiled track (TT) area, 303 is ST, 304 is a defective track, 305 is TT, 306 is an area used as a spare track, and 310 is a band with the defective track therebetween.

FIG. 3(A) shows a state before the allocation of ST and TT, and FIG. 3(B) shows a state after the allocation of ST and TT. As shown in FIG. 3(A), the zone 300 has been divided temporarily into two areas of the shingled track (ST) area 301 and the spare or tiled track (TT) area 302 based on a capacity ratio of ST to TT in the zone 300 before tracks are allocated to the zone 300. According to the present embodiment, a necessary area is transferred from the spare or tiled (TT) area 302 to the shingled track (ST) area 302 when there is a defective track 304 in the shingled track (ST) area 301. By this transfer, a start position of TT 305 moves to an end side of the zone from a start position of the spare or tiled track (TT) area 302 as much as the area 306 used as a spare track. Since the vicinity of the defective track in the shingled track (ST) area forms the band including the defective track such as 310, the track density decreases in the vicinity of the defective track.

The high-order device sets the capacitor ratio of ST to TT for the disk drive by an S.M.A.R.T command or a vender unique command. Other than the capacity ratio of ST to TT, the high-order device can make a setting based on capacities of ST and TR. As for the setting based on the capacity ratio of ST to TT, it is possible to independently set each zone or to make the same setting with respect to all zones. As for the setting based on capacities of ST and TT, it is possible to set independently in each zone or to make the setting of the minimum capacity alone with respect to all zones. When the minimum capacity of ST and the minimum capacity of TT are set, as circumstances demand, a specific capacity is determined in a range meeting requirements of each minimum capacity. The method of temporarily dividing into the shingled track (ST) area 301 and the spare or tiled track (TT) area 302 are not limited to the above, and any given method can be used.

Referring now to FIGS. 4 and 5, a track allocation method according to the first embodiment of the track allocation method of the disk drive of the present invention will be described. FIG. 4 shows a flowchart of the track allocation method, and FIG. 5 shows a track allocation management table.

The track allocation management table of FIG. 5 controls which tracks ST and TT are allocated to.

The entries of the track management table includes a start track (a start number of the track) 501, an end track (an end number of the track) 502, and a track type 503. By managing the track type 503 n a range of tracks comprising the start track 501 and end track 502, it becomes possible to make the size of the track management table smaller than the case wherein a track type is managed for each track. To the entry of the track type 503, "0" is entered in the case of ST and "1" is entered in the case of TT.

According to the track allocation method of FIG. 4, ST and TT are allocated to each zone. When a plurality of zones exists, the track allocation processing of FIG. 4 is repeated as many times as the number of zones. The case where two types of track widths, or ST and TT, exist in the zone will be described here. However, the method can easily be applied to the case where there are more than two types of track widths.

When the allocation of tracks is started, the process advances to step 401. In step 401, the head is moved to the forefront of the subject zone. The process advanced to step 410 when step 401 is over. In step 410, it is checked whether or not the subject area is a defective track. If it is a defective track, the process advances to step 420 and, if not, the process advances to step 422. In step 420, it is checked whether or not the spare or tiled track (TT) area 302 can afford to transfer an area to the shingled track (ST) area. For example, when the minimum capacity needed as TT in the zone is separately set, it is checked whether or not the capacity of TT runs short by transferring an area to the shingled track (ST) area. The process advances to step 421 when it can afford to transfer, and the process advances to step 423 when it cannot afford to transfer. In step 421, the area is transferred from the spare or tiled track (TT) area to the shingled track (ST) area.

In step 423, ST composing the band under allocation is released, and is transferred to the TT area. The process advances to step 424 when step 423 is over. In step 424, the head is moved to the forefront of the area released in step 423. The process advances to step 442 when step 424 is over.

In step 421, an extra area needed because of being unable to partially overwrite a defective track and adjacent tracks is transferred from the spare or tiled track (TT) area 302 to the shingled track (ST) area 301. The process advances to step 422 when step 421 is over. In step 422, ST is allocated to the subject area. The process advances to step 430 when step 422 is over. In step 430, it is checked whether or not the required numbers of ST necessary to compose the band have been allocated. The process advances to step 431 when the required numbers of ST have been allocated, and the process advances to step 432 when they have not been allocated yet. Since the allocation of ST necessary for the band is not completed in step 432, the head is moved as much as the track width of ST. The process returns to step 410 when step 432 is over. Since the allocation of ST necessary for the band is completed in step 431, the head is moved as much as the band gap 202 of FIG. 2. The process advances to step 441 when step 431 is over. In step 441, a start track and an end track of the band whose allocation of necessary ST is completed are entered in the start track 501 and the end track 502 of the track allocation management table, respectively. Further, "0" representing ST is entered in the track type 503. The process advances to step 440 when step 441 is over.

In step 440, it is checked whether or not the required numbers of bands for the subject zone have been secured. The process advances to step 442 when they have been secured, and the process returns to step 410 when they have not been secured. In step 442, TT is allocated to the subject area. The process advances to step 443 when step 442 is over. In step 443, the head is moved as much as the track width of TT to move on to the next area. The process advances to step 450 when step 443 is over. In step 450, it is checked whether or not the head has reached the end of the subject zone. The process advances to step 451 when the head has reached the end of the zone, and the process returns to step 442 when the head has not reached the end of the zone. In step 451, a start track and an end track of the allocated TT group are entered in the start track 501 and end track 502 of the track allocation management table. Further, "1" representing TT is entered in track type 503. When step 451 is over, the track allocation processing is ended.

If the track allocation table of FIG. 5 is stored in a system area of the disk drive, the high-order device connected with the disk drive can find about the capacitor ratio and the capacity of ST and TT of each zone by a S.M.A.R.T. command and a vender unique command.

In this embodiment, the case where there are two types of tracks having different track widths in a zone has been described. However, the types of the track widths are not limited to two. The present invention can easily be applied to the case where there are any given numbers of track widths.

Embodiment 2

According to the first embodiment, when the defective track exists in the shingled track (ST) area, the band is formed including the defective track such as 310. Therefore, the track density decreases around the defective track. On the contrary, according to the present embodiment, when there is a defective track and the band cannot be formed with the minimum area, ST and TT are arranged by the closest packing method wherein not ST but T1 is allocated to that area.

FIG. 6 shows an example of track arrangement in the zone according to a second embodiment of the track allocation method of the disk drive of the present invention. FIG. 6(A) shows a state before allocation of ST and TT, and FIG. 6(B) shows a state after allocation of ST and TT.

As shown in FIG. 6(A), before tracks are allocated to a zone 300, based on the capacity ratio of ST to TT in the zone 300, the zone 300 is temporarily divided into two areas, namely, a shingled track (ST) area 301 and a spare or tiled truck (TT) area 302. According to the present embodiment, when there is a defective track 304 in the shingled track (ST) area 301 and a band cannot be formed with the minimum area, the ST area is transferred to the TT area and TT is allocated. The effective capacity in the zone is increased by the track allocation of the closest packing method wherein all bands are composed with the minimum area. For example, when comparing the track arrangement of the first embodiment shown in FIG. 3(B) and the track arrangement of the second embodiment shown in FIG. 6(B), the track arrangement in FIG. 4(B) includes one more TT by not containing the defective track in the band.

Figure 9:
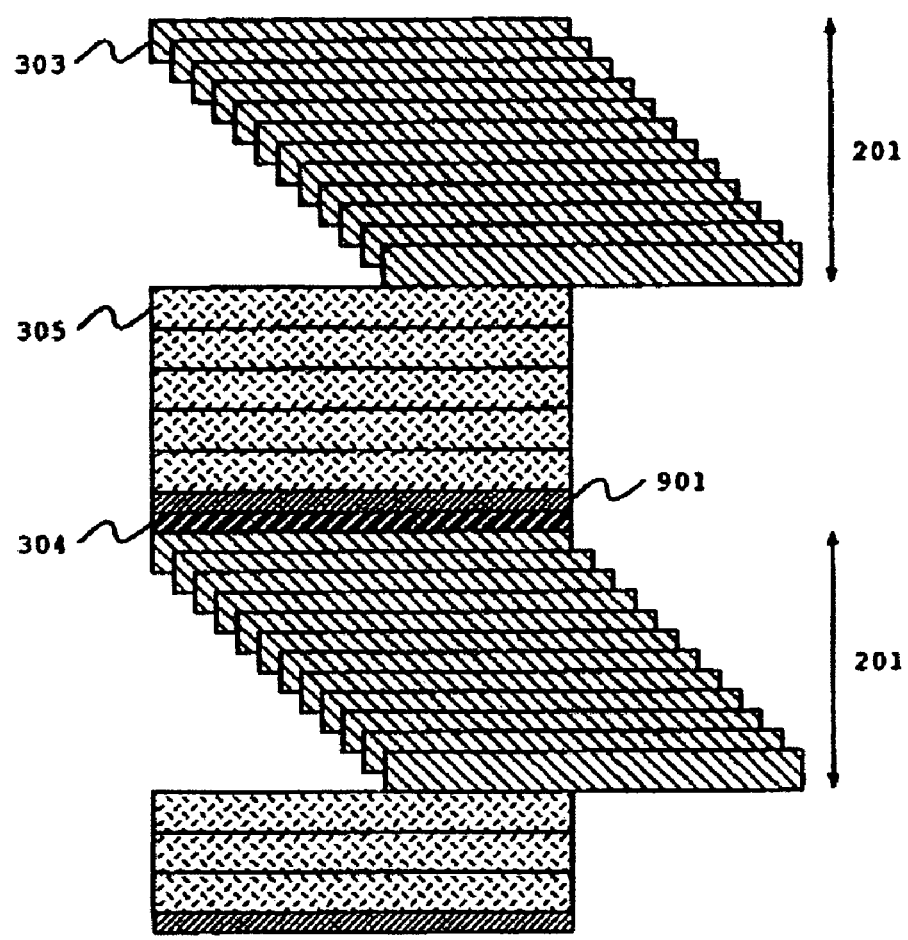
FIG. 9 shows track arrangement in the zone according to the second embodiment of the track allocation method of the disk drive in accordance with an embodiment of the present invention.

FIG. 9 shows another example of track arrangement in the zone according to the second embodiment of the track allocation method of the disk drive of the present invention. In FIG. 9, numeral 901 denotes an invalid area to which no track is allocated.

While the band 201 was composed of three ST 303 in the example of FIG. 6, the band 201 is composed of twelve ST 303 in the example of FIG. 9. The more the number of ST 303 necessary for composing the band 201 increases, the more the number of TT 305 allocated around the defective track 304 increases. In FIG. 9, five TT 305 are allocated around the defective track 304. The area that doesn't come to the track width of TT 305 remained after allocating TT 305 to an area around the defective track 304 becomes an invalid area 901 to which no track can be allocated. Namely, the present invention has a feature wherein the width of the invalid area 901 always becomes less than the track width of TT 305.

Figure 8:
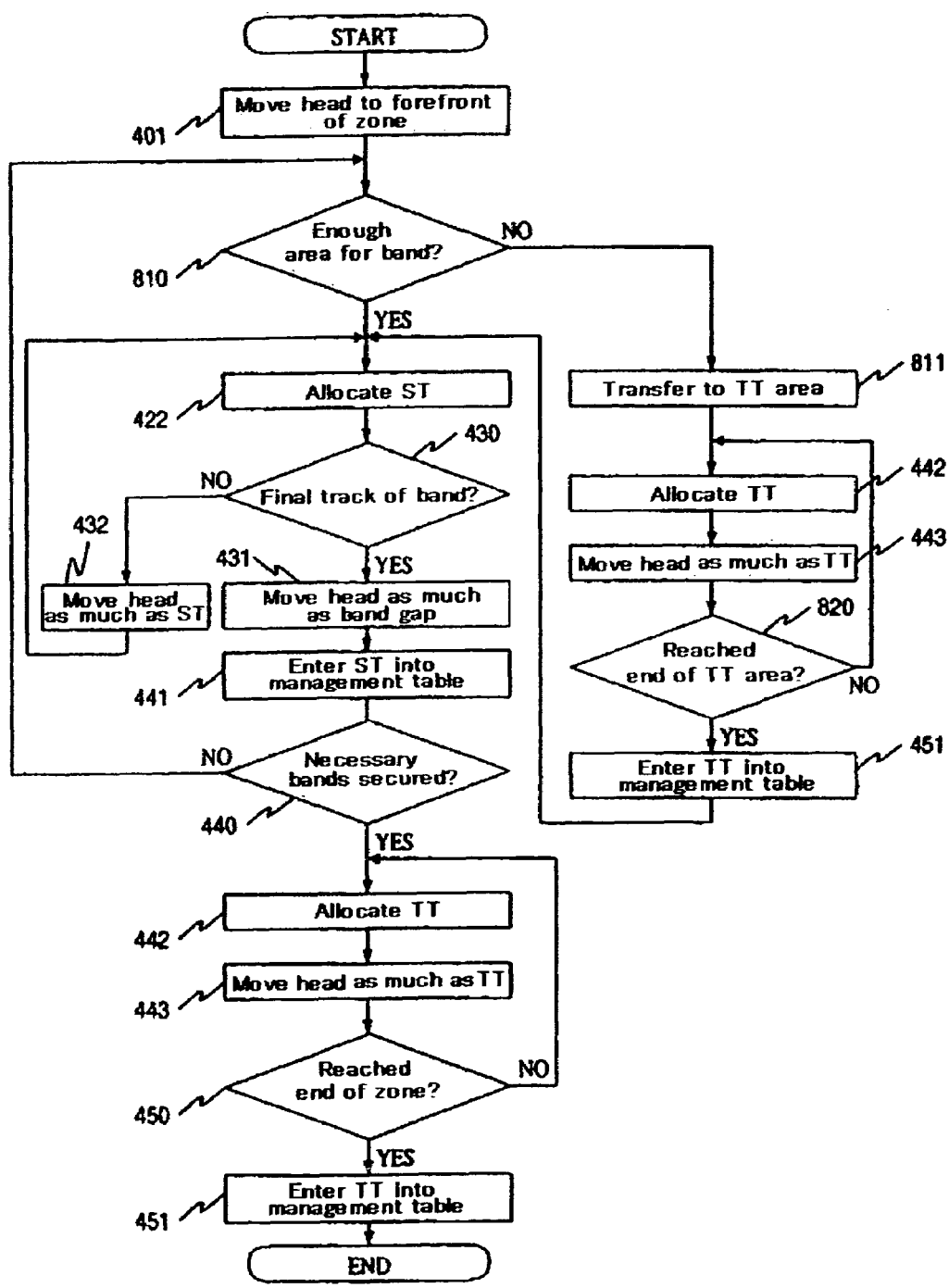
FIG. 8 shows a flowchart of the second embodiment of the track allocation method of the disk drive in accordance with the present invention.

FIG. 8 shows a flowchart of a track allocation method according to a second embodiment of the track allocation method of the disk drive of the present invention. According to the track allocation method of FIG. 8, ST and TT are allocated to each zone. When there exists a plurality of zones, the track allocation processing of FIG. 4 is repeated as many times as the number of zones. The case where two types of track widths, or ST and TT, exist in the zone will be described here. However, the method can easily be applied to the case where there are more than two track widths.

When the track allocation is started, the process advances to step 401. The process advances to step 810 when step 401 is over. In step 810, it is checked whether or not the band can be composed of the minimum area, namely, whether or not a defective track is included in the area which will compose the band. When the defective track is not included and the band can be composed of the minimum area, the process advances to step 422 and ST is allocated to the subject area. The process advances to step 811 when the band cannot be composed of the minimum area.

When the band can be composed of the minimum area, the process advances to step 430 after step 422 is ended. In step 430, it is checked whether or not the track is a final track composing the band. The process advances to step 431 if it is the final track, and the process advances to step 432 if it is not the final track. The process returns to step 422 after step 432 is ended when it is not the final track. The process advances to step 441 after step 431 is ended when it is the final track, and the process advances to step 440 when step 441 is over. In step 440, it is checked whether or not the number of bands necessary for the subject zone has been secured. The process advances to step 442 when it has been secured, and the process returns to step 810 when it has not been secured.

When the band cannot be composed of the minimum area, the subject area is transferred from the ST area to the TT area in step 811. Arranging TT in place of ST becomes possible by transferring part of the ST area that cannot compose the band with the minimum area in step 811. Not composing the band astride the defective track, all tracks in the band except the final track of the band are partially overwritten with adjacent tracks. Therefore, the use efficiency of the area increases, and the effective capacity of the disk drive is improved. The process advances to step 442 when step 811 is over, and TT is allocated. Then, the process advances to step 443 when step 442 is over, and further advances to step 820 when step 443 is over. In step 820, it is checked whether or not the head has reached the end of the TT area to which the area is transferred from the ST area to the TT area in step 811. The process advances to step 451 when it has reached the end of the TT area and the process returns to step 442 when it has not reached the end of the TT area. The process returns to step 422 when step 451 is over.

The process advances to step 442 when the necessary number of bands has been secured in step 440. The process advances to step 443 when step 442 is over, and the process advances to step 450 when step 443 is over. In step 450, it is checked whether or not the head has reached the end of the subject zone. If it has reached the end of the zone, the process advances to step 451, and if it has not reached there, the process returns to step 442. When step 451 is over, the track allocation processing is ended.

In AV data processing, data backup processing, etc., it is required to write a large amount of data collectively and to have a large capacity. Therefore, the usefulness of the present invention is high in that it enables unnecessary spare tracks to be reusable as normal tracks and increases the effect capacity of the disk drive.

What is claimed is:

1. A track allocation method of a disk drive, the disk drive comprising:
    a storage medium and a controller sending and receiving commands and data to and from a high-order device and performing writing control or reading control over said storage medium;
    wherein said storage medium is divided into a plurality of zones having different numbers of sectors for each track;
    wherein there exist a first track group having a first track width and a second track group having a second track width on said storage medium; and
    wherein, when areas of said first track group and said second track group are secured in said zone, said controller executes the steps of:
    dividing said zone into a first area for said first track group and a second area for said second track group based on a capacity ratio of said first track group to said second track group to be secured in said zone or based on a first initial value of the capacity of said first track group and a second initial value of the capacity of said second track group;
    allocating said first track group to said first area;
    transferring an area lacking because of a defective track from said second area to said first area when there exists the defective track causing prohibition of use of the entire track in said first area; and
    allocating said second track group to said second area.

2. A track allocation method of a disk drive according to claim 1, wherein said controller executes the step of setting said capacity ratio or said first initial value and said second initial value based on one value or a plurality of values specified by the high-order device.

3. A track allocation method of a disk drive according to claim 1, wherein said controller executes the step of storing, in a system area of said disk drive referable from the high-order device,
    said capacity ratio or said first initial value and said second initial value; and
    a ratio of the capacity of said first track group allocated to said first area to the capacity of said second track group allocated to said second area or the capacity of said first track group allocated to said first area and the capacity of said second track group allocated to said second area.

4. A track allocation method of a disk drive according to claim 1, wherein said controller executes the steps of:
    calculating a capacity of said second track group that can be allocated to said second area; and
    halting, when said calculated capacity is less than the prescribed minimum capacity, the execution of the step of transferring tracks lacking because of said defective tracks from said second area to said first area.

5. A track allocation method of a disk drive according to claim 4, wherein said controller executes the step of setting said minimum capacity based on a value specified by a high-order device.

6. A track allocation method of a disk drive, the disk drive comprising a storage medium and a controller sending and receiving commands and data to and from a high-order device and performing writing control or reading control over said storage medium;
    wherein said storage medium is divided into a plurality of zones having different numbers of sectors for each track;
    wherein there exist a first track group having a first track width and a second track group having a second track width on said storage medium;

wherein said first track group is divided into groups each having prescribed first numbers of tracks; and wherein, when areas of said first track group and said second track group are secured in said zone, said controller executes the steps of:

dividing said zone into a first area for said first track group and a second area for said second track group based on a capacity ratio of said first track group to said second track group to be secured in said zone or based on a first initial value of the capacity of said first track group and a second initial value of the capacity of said second track group;

allocating said first track group to said first area;

allocating said second track group with said second numbers of tracks to an area in the vicinity of a defective track where the first track group with numbers of tracks cannot be secured when there exists the defective track causing prohibition of use of the entire tracks in said first area and transferring an area corresponding to said second numbers of tracks from said second area to said first area; and allocating said second track group to said second area.

7. A track allocation method of a disk drive according to claim 6, wherein said controller executes the step of setting said first number of tracks based on a value specified by a high-order device.

8. A track allocation method of a disk drive according to claim 6, wherein an area corresponding to said defective tracks is also transferred from said second area to said first area when an area corresponding to said second numbers of tracks is transferred from said second area to said first area.

* * * * *